(12) United States Patent
Washiya

(10) Patent No.: US 6,700,979 B1
(45) Date of Patent: Mar. 2, 2004

(54) ECHO CANCELLER

(75) Inventor: Kyoji Washiya, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/361,739

(22) Filed: Jul. 28, 1999

(30) Foreign Application Priority Data

Jul. 29, 1998 (JP) .......................................... 10-213561

(51) Int. Cl.[7] .......................... H04M 1/00; H04M 9/00; H04M 9/08
(52) U.S. Cl. ............................ 379/406.09; 379/406.01; 379/406.04; 379/388.02; 379/392.01
(58) Field of Search ...................... 379/387.01, 388.01, 379/388.02, 388.07, 390.02, 390.03, 392.01, 406.01, 406.16

(56) References Cited

U.S. PATENT DOCUMENTS 6,282,176 B1 * 8/2001 Hemkumar
6,496,581 B1 * 12/2002 Finn et al.

FOREIGN PATENT DOCUMENTS

WO    WO 91/01682    * 2/1991

* cited by examiner

*Primary Examiner*—Duc Nguyen
(74) *Attorney, Agent, or Firm*—Volentine Francos, PLLC

(57) ABSTRACT

An echo canceler provided with a noise detecting section which holds signals showing a presupposed ambient noise such as a horn of a vehicle. The noise detecting section is adapted to monitor a sending signal received through a microphone and, while detecting such ambient noises in the sending signal, an adaptive filter outputs a pseudo echo existing immediately before the ambient noise is detected. Even during the generation of ambient noises, an echo noise can be eliminated and the generation of a foreign voice (noise) can be avoided as well.

17 Claims, 2 Drawing Sheets

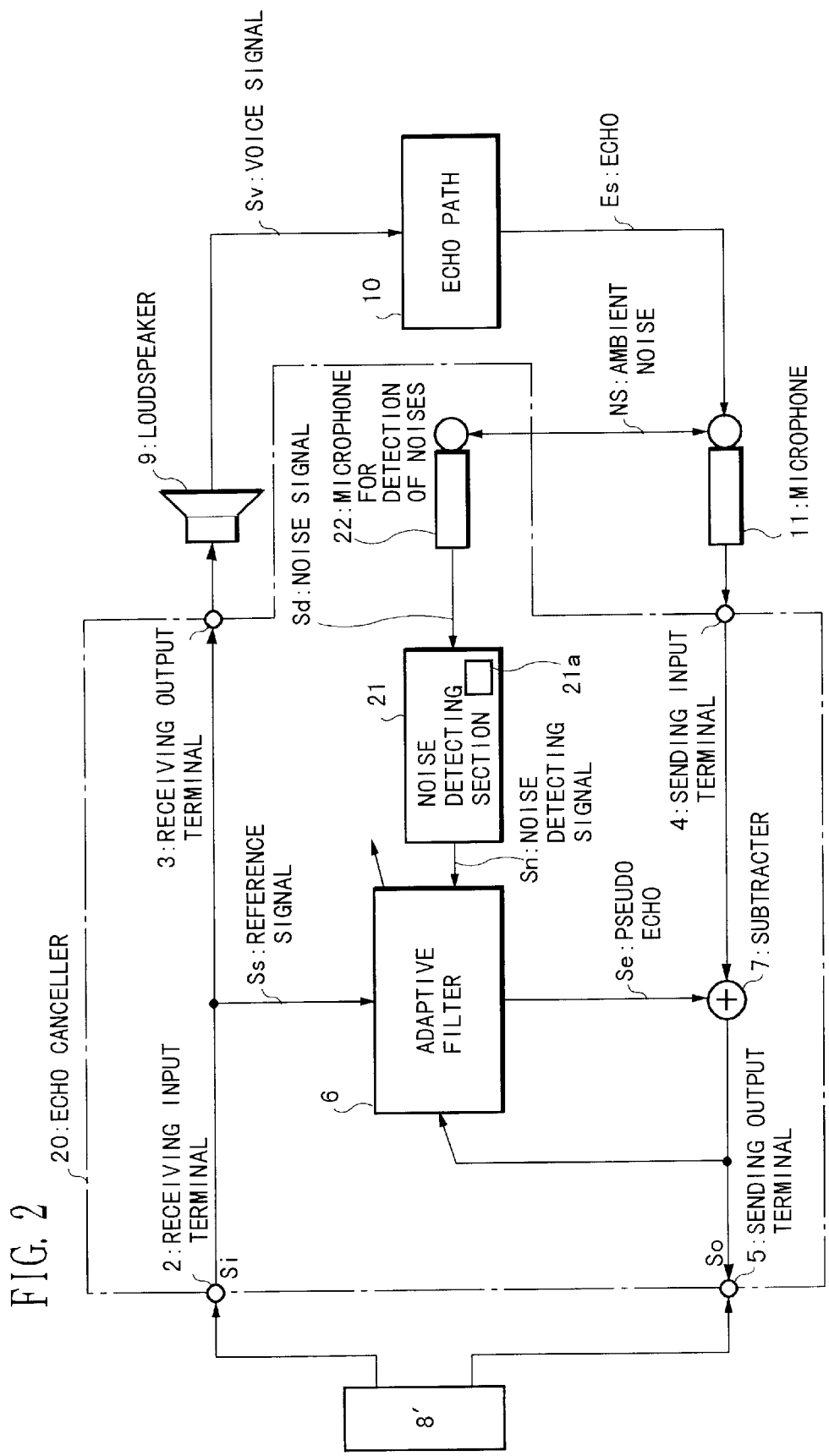

ECHO CANCELLER

BACKGROUND OF THE INVENTION

1. Field of the Invention

The present invention relates to an echo canceller used to eliminate an echo generated due to acoustic coupling between a telephone talker and a listener in a hand-free telephone system and the like.

2. Description of the Related Art

In a car phone system, for example, a hand-free telephone system is expected to be useful for ensuring operability and safety of a driver. The hand-free telephone system is a system to speak by using a microphone (transmitter) and a loudspeaker (receiver) located in advance at a specified position in a car.

In the hand-free telephone system, speech quality is reduced due to a mixed noise between a telephone talker and a listener. The noise includes (1) an echo noise generated by acoustic coupling between a microphone (transmitter) and a loudspeaker (receiver) and (2) an ambient noise caused by ambient sounds, running sounds and the like. A sending signal emitted by the microphone (transmitter) is associated, in real time, with a receiving signal received by a loudspeaker (receiver). If the echo noise is mixed with the sending signal, the echo noise can be easily detected by referencing to the receiving signal itself being a noise source. Based on such detecting results, a pseudo noise is generated and subtracted from the sending signal. Such principles have been employed in a conventional echo canceller.

However, such conventional technology has problems to be solved as described below. That is, in the conventional echo canceller, a noise is detected by comparing a sending signal with a noise mixed with a receiving signal being a noise source. Accordingly, if a noise not caused by the receiving signal, i.e., an ambient noise described above as a type of the noise (2) is mixed with a sending signal, accurate detection of echo noises is impossible. Moreover, based on the results of such conventional detection, a pseudo noise is generated and is subtracted from the sending signal. Thus, an echo noise cannot be eliminated and it is a cause for a foreign voice (i.e., noise).

SUMMARY OF THE INVENTION

In view of the above, it is an object of the present invention to provide an echo canceller wherein, even during generation of ambient noises, an echo noise can be eliminated and generation of a foreign voice (i.e., noise) can be avoided, thus improving the speech quality of a hand-free telephone system.

It is another object of the present invention to provide an echo canceller wherein the detection of ambient noises are made easy and the avoidance of the generation of noises is made reliable.

According to an aspect of the present invention, there is provided an echo canceller for preventing an echo of an output from a receiver receiving a signal transmitted by a transmitter from returning to the receiver through the transmitter comprising:

a noise detecting section detecting an ambient noise surrounding the transmitter and sending out a noise detecting signal if a level of a signal showing the ambient noise exceed a predetermined value; and an adaptive filter receiving, as an input signal, each of a receiving signal to be received by the transmitter and of a sending signal to be outputted from the transmitter and generating a pseudo echo corresponding to a change of both input signals in order to prevent the echo from returning and further operating, when receiving the noise detecting signal, to make output characteristics of the pseudo echo fixed to inhibit a change of the pseudo echo caused by the ambient noise.

In the foregoing, a preferable mode is one wherein the adaptive filter has a plurality of tap coefficients used to set a different time delay and attenuation coefficient depending on both input signals in order to generate a pseudo echo corresponding to both input signals and stops operations for changing the tap coefficient when receiving the noise detecting signal.

Also, a preferable mode is one wherein the adaptive filter is a transversal filter.

Also, a preferable mode is one wherein the noise detecting section is provided with memory to preset information about a signal level and frequency of the ambient noise.

Also, a preferable mode is one wherein the noise detecting section detects a noise signal picked up by the transmitter.

Furthermore, a preferable mode is one wherein the noise detecting section receives a noise signal picked up by a microphone designed specifically for the detection of an ambient noise and being different from the transmitter.

BRIEF DESCRIPTION OF THE DRAWING

The above and other objects, advantages and features of the present invention will be more apparent from the following description taken in conjunction with the accompanying drawings in which:

FIG. 2 is a block diagram illustrating an echo canceller according to a second embodiment.

DESCRIPTION OF THE PREFERRED EMBODIMENTS

Figure 1:
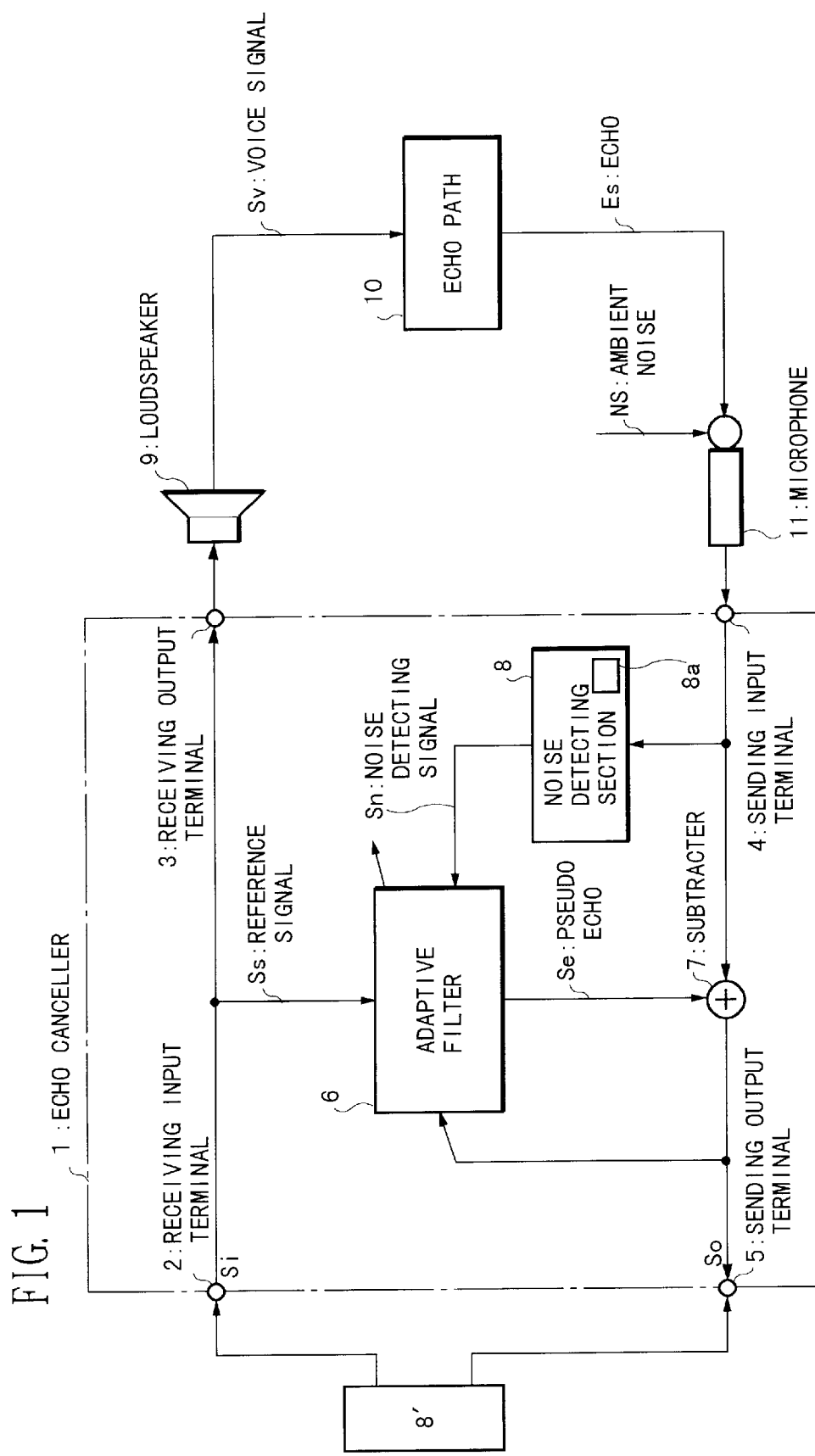
FIG. 1 is a block diagram showing an echo canceller according to a first embodiment.

Best modes of carrying out the present invention will be described in further detail using various embodiments with reference to the accompanying drawings.

First Embodiment

According to a first embodiment, an echo canceller is provided with a noise detecting section which holds internally signals showing information about presupposed ambient noises such as a horn of a vehicle and the like. The noise detecting section is adapted to monitor a sending signal received through a microphone and, while detecting such ambient noises in the sending signal, an adaptive filter outputs a pseudo echo existing immediately before the ambient noise is detected. Accordingly, the sending signal can avoid an adverse effect caused by the ambient noise. To achieve this purpose, the echo canceller is so configured as described below.

FIG. 1 is a block diagram showing the echo canceller of the first embodiment of the present invention. As shown in FIG. 1, the echo canceller 1 is provided with a receiving input terminal 2, a receiving output terminal 3, a sending input terminal 4, a sending output terminal 5, an adaptive filter 6, a subtracter 7 and a noise detecting section 8. The receiving input terminal 2 is an input terminal to receive a receiving signal Si from a radio 8' and to transfer it to the receiving output terminal 3. The receiving output terminal 3 is an output terminal to transfer a receiving signal Si fed from the receiving input terminal 2 to a loudspeaker 9. The sending input terminal 4 is an input terminal to receive a sending signal So from a microphone 11 and to transfer it to the sending output terminal 5. The sending output terminal 5 is an output terminal to receive the sending signal So from the sending input terminal 4 and to transfer it to the radio 8'.

The adaptive filter 6 serves to detect an echo Es to be fed to the microphone 11, which is produced when a voice signal Sv supplied from the loudspeaker 9 is reflected by window glass in a car, its car body wall and the like, and to produce a pseudo echo Se being similar to the echo Es and to output it. That is, the adaptive filter receives part of the receiving signal Si from the receiving input terminal 2 and uses part of this receiving signal Si as a reference signal which is associated with part of the sending signal So received simultaneously from the substracter 7. The adaptive filter is adapted to change a tap coefficient based on the associated results to obtain the pseudo echo Se, and to transfer the pseudo echo Se to the substracter 7.

Ordinarily, the adaptive filter 6 is composed of a transversal filter. Delay time of a great number of delay devices provided within the transversal filter is associated with the length of a path of the echo Es and the resulting volume is also associated with its signal level as well. That is, the echo Es, which has reached the microphone 11 through a plurality of echo paths from the loudspeaker 9 in a car, is associated with a great number of delay devices provided within the transversal filter. Based on this association, the tap coefficient is calculated. This tap coefficient is always changed during a telephone speech.

The subtracter 7 receives the sending signal So from the microphone 11. At the same time, the subtracter 7 receives the pseudo echo Se from the adaptive filter 6. The pseudo echo Se is subtracted from the sending signal So and the subtraction results are transferred through the sending output terminal 5 to the radio 8'.

The noise detecting section 8 holds, in a memory element 8a provided therein, signals showing presupposed ambient noises such as horns of vehicles as signal information specified by its signal level, signal frequency and the like. The noise detecting section 8 continues to monitor the sending signal So fed from the microphone 11. When the noise detecting section 8 detects the ambient noises in the sending signal So , i.e., signal components exceeding the range of the specified signal level, signal frequency, etc., in the sending signal So, it judges that the ambient noise exists in the sending signal So. At this point, the noise detecting section 8 sends out a noise detecting signal Sn to the adaptive filter 6.

Moreover, the echo canceller 1 is also provided with the loudspeaker 9, an echo path 10 and the microphone 11. The loudspeaker 9 serves to convert the receiving signal Si to the voice signal Sv. The echo path 10 is a pseudo constitutional element generically representing paths through which the voice signal Sv emitted by the loudspeaker 9 and reflected by the window glass, the car body wall and the like passes to the microphone 11. The microphone 11 serves to convert the sending voice to the sending signal So. At the same time, it receives the echo Es passed through the echo path and converts the echo to an echo noise.

The operations of the echo canceller of the first embodiment are described hereinafter. Prior to the description of a real-time operation of the echo canceller, setting of the tap coefficient in an initial state of the adaptive filter 6 which generates the pseudo echo Se is described. The following is one of examples of methods for setting the tap coefficient in an initial state. That is, an impulse signal as the receiving signal Si is transferred to the loudspeaker 9. At this point, the voice signal Sv emitted by the loudspeaker passes through the echo path 10 and is converted to the echo Es and then received by the microphone 11. The microphone 11 converts this echo Es to the sending signal So. The signal components of the sending signal So are plotted with the time elapse as ordinate and the signal level as abscissa, the former being associated with the delay time and the latter with the signal level of many delay devices provided within the transversal filter. Thus, the tap coefficient in the initial state of the adaptive filter can be obtained.

Now, let it be supposed that the receiving signal Si has been transferred to the receiving input terminal 2 of the echo canceller 1 from a radio 8'. Part of the receiving signal Si is transferred as a reference signal to the adaptive filter 6 and other most part of the receiving signal Si is transferred through the receiving output terminal 3 to the loudspeaker 9. This receiving signal Si is converted to the voice signal Sv by the loudspeaker 9 and emitted in a car. Part of the voice signal Sv is reflected by the window glass, car body wall, etc. and received as the echo Es by the microphone 11. The echo Es is converted as part of the sending signal So together with the sending voice by the microphone 11. Part of the sending signal So is transferred to the noise detecting section 8 and most of the remaining parts to the subtracter 7. The noise detecting section 8 continues to monitor the sending signal So. The noise detecting section 8 stops its operations until it detects noises judged by referring to the information about ambient noises held within it. Let it be supposed, for example, that the information about ambient noises such as horns of vehicles is specified by its signal frequency and/or signal level. Unless the noise detecting section 8 detects such signals as having components exceeding the specified signal frequency and/or signal level, it does not start its operations.

The subtracter 7 receives most of the sending signal So. At the same time, it receives the pseudo echo Se in the initial state from the adaptive filter 6. The subtracter 7 subtracts the pseudo echo Se in the initial state from the sending signal So and transfers the results to the radio 8'. The sending signal So in this state should not contain the echo component basically. However, the signal components of real-time sending signal So varies constantly. Accordingly, this echo signal So contains the echo components. The adaptive filter 6 receives part of the sending signal So and associates it with the reference signal Ss. Based on the results, the tap coefficient is changed. Its results are reflected in the pseudo echo Se and the echo components contained in the sending signal So are eliminated. Unless the ambient noise Ns exists, the operations described above are repeated and follows the changes in the echo Es.

The operations at the time when the ambient noise Ns is mixed therewith are described below. Let it be supposed, for example, that horns of vehicles are mixed with the echo Es. At this point, the echo Es is converted, with the ambient noise Ns mixed therewith, to the sending signal So together with the sending voice by the microphone 11. Part of the sending signal So is transferred to the noise detecting section 8 and most of the remaining parts to the subtracter 7.

The noise detecting section 8 continues to monitor the sending signal So. If the noise detecting section 8 detects that signal components of the horns of vehicles exceed the range of the signal frequency and/or signal level of the signals showing the information about the ambient noise held by the noise detecting section itself, it transfers the noise detecting signal Sn to the adaptive filter 6. When the adaptive filter 6 receives this noise detecting signal Sn, it stops operations of receiving part of the sending signal So and comparing it with the reference signal Ss. As a result, the change of the tap coefficient is stopped and the value of the pseudo echo Se still remains in the state existing immediately before the noise detecting signal Sn is received.

For convenience' sake, the description has been made assuming that the conditions for the transfer of the noise detecting signal Sn to the adaptive filter 6 are that the signal components of the ambient noise exceed the range of the signal frequency and/or signal level of the signals showing the information about the ambient noise held the adaptive filter, however, the conditions are not limited to these. These are only one of examples, i.e., the conditions may be that either of the signal frequency or signal level is specified for the judgement of the ambient noises. In addition to these, other factors such as signal waveforms can be used for the conditions.

Thus, the following effect is achieved by providing the noise detecting section 8 which monitors a sending signal So and, when detecting an ambient noise in the sending signal, stops changes of a tap coefficient of the adaptive filter.
1. Even during generation of ambient noises, an echo noise can be eliminated.
2. The generation of a foreign voice (noise) can be avoided.
3. As a result, the speech quality of a hand-free telephone system can be improved.

Second Embodiment

An echo canceller of a second embodiment is provided with a noise detecting section which holds internally signals showing information about, for example, horns of vehicles. The noise detecting section monitors noise signals received from a microphone for detection of noises, which is designed specifically for detection of ambient noises, and while detecting the ambient noise in the noise signals, an adaptive filter outputs a pseudo echo immediately before the ambient noise is detected. Accordingly, the sending signal can avoid an adverse effect caused by ambient noises. To achieve this purpose, the echo canceller of the second embodiment is so configured as described hereafter.

FIG. 2 is a block diagram showing the echo canceller of the second embodiment of the present invention. As shown in FIG. 2, the echo canceller 20 is provided with a receiving input terminal 2, a receiving output terminal 3, a sending input terminal 4, a sending output terminal 5, an adaptive filter 6, a subtracter 7, a noise detecting section 21 and a microphone 22 for detection of noises.

Only operations being different from those of the first embodiment are described here. The microphone 22 for detection of noises is a microphone designed specifically for detecting the ambient noise Ns. This is one constitutional element for the echo canceller 20 which is provided aside from the microphone 11. Only operations of the microphone 22 being different from those of the microphone 11 are also described here. The microphone 11 is a part to convert a sending voice of a telephone talker to the sending signal So. At the same time, it receives an echo Es passed through an echo path 10 and converts it to an echo noise. On the other hand, the microphone 22 for detection of noises does not intend to convert the sending voice to the sending signal So. Accordingly, the microphone 22 is located in a place or in a direction where ambient noises are most easily received and where the sending voice and/or the echo Es are hardly received, regardless of the location of the microphone 11. The noise detecting section 21 holds, in a memory element 21a provided within it, signals showing the information about presupposed ambient noises (such as horns of vehicles) the signal level and/or signal frequency of which is specified. Moreover, the noise detecting section 21 continues to monitor a noise signal Sd fed from the microphone 22 for detection of noises. When the noise detecting section 21 detects the ambient noises Ns in the noise signal Sd, i.e., signal components exceeding the range of the specified signal level, signal frequency, etc., in the noise signal Sd, it judges that the ambient noise signal Ns exists in the sending signal So. At this point, the noise detecting section 21 sends out a noise detecting signal Sn to the adaptive filter 6. The constituents other than described above are the same as in the first embodiment.

Operations of the echo canceller of the second embodiment are described hereinafter. Let it be supposed that the receiving signal Si is transferred from a radio to a receiving input terminal 2 of the echo canceller 20. Part of the receiving signal Si is transferred as a reference signal Ss to the adaptive filter 6 and most of the remaining parts to the loudspeaker 9 through the receiving output terminal 3. The receiving signal Si is converted to a voice signal Sv by the loudspeaker 9 and emitted in a car. Part of the voice signal Sv is reflected by window glass in a car or its body wall and received as an echo Es by the microphone 11.

Most of the echo Es is converted to the sending signal So by the microphone 11. The sending signal So is transferred to a subtracter 7. At the same time, part of the echo Es is converted to the noise signal Sd by the microphone 22 for detection of noises. The noise detecting section 21 continues to monitor the noise signal Sd. The noise detecting section 21 stops its operation until it detects ambient noises Ns the signal components of which exceed the range of signals showing the ambient noise held within the noise detecting section 21. For example, let it be supposed that components of signals showing ambient noises such as horns of vehicles are specified by their signal frequencies and/or signal levels. Unless the noise detecting section detects the signal components exceeding the signal frequency and/or signal level, it does not start its operations.

The subtracter 7 receives the sending signal So. It also receives simultaneously the pseudo echo Se in the initial state from the adaptive filter 6. It subtracts the pseudo echo Se in the initial state from the sending signal So and transfers its results to the radio through the sending output terminal 5. The sending signal So in this state should not contain the echo component basically.

However, the signal components of the real-time sending signal So varies constantly. Accordingly, this sending signal So contains the echo component. The adaptive filter 6 receives part of the sending signal So and associates it with a reference signal Ss. Based on the results, the tap coefficient is changed. The results are reflected in the pseudo echo Se and the echo components contained in the sending signal So are eliminated. Unless the ambient noise Ns exists, the operations described above are repeated and follows the changes in the echo Es.

Operations at the time when the noise detecting section 21 detects the ambient noise Ns are described hereafter. Let it be supposed, for example, that horns of vehicles are mixed with the echo Es. If the noise detecting section 8 detects that signal components of the horns of vehicles exceed the range of the signal frequency and/or signal level of the signals showing the information about the ambient noise held by the noise detecting section itself, it transfers the noise detecting signal Sn to the adaptive filter 6. When the adaptive filter 6 receives the noise detecting signal Sn, it stops operations of receiving part of the sending signal So and associating it with the reference signal Ss. As a result, the change of the tap coefficient is stopped and the value of the pseudo echo Se still remains in the state existing immediately before the noise detecting signal Sn is received.

For convenience' sake, the description has been made assuming that the conditions for the transfer of the noise detecting signal Sn to the adaptive filter 6 are that the signal components of the ambient noise exceed the signal frequency and/or signal level of the signals showing the information about the ambient noise held by the adaptive filter, however, the conditions are not limited to these. These are only one of examples, i.e., the conditions may be that either of the signal frequency or signal level is specified for the judgement of the ambient noises. In addition to these, other factors such as signal waveforms can be used for the conditions.

Thus, the following effect is achieved by providing the microphone for detection of noises designed specifically for detection of the ambient noise Ns.
1. The detection of ambient noises are made easier compared with operations of the first embodiment.
2. The avoidance of generation of noises is made more reliable compared with operations of the first embodiment.
3. As a result, the speech quality of a hand-free telephone system can be improved.

It is thus apparent that the present invention is not limited to the above embodiments but may be changed and modified without departing from the scope and spirit of the invention.

What is claimed is:

1. An echo canceller for preventing an echo of an output from a receiver receiving a signal transmitted by a transmitter from returning to said receiver through said transmitter, the echo canceller comprising:
    a noise detecting section detecting an ambient noise surrounding said transmitter, comparing the detected ambient noise to a prestored representation of target ambient noise, and sending out a noise detecting signal if a level of the detected ambient noise exceeds a level of the target ambient noise; and
    an adaptive filter receiving, as an input signal, each of a receiving signal to be received by said receiver and a sending signal to be outputted from said transmitter, and generating a pseudo echo corresponding to a change in the receiving signal and the sending signal input thereto, in order to prevent said echo from returning and further operating, when receiving said noise detecting signal, to make output characteristics of said pseudo echo fixed to inhibit a change of said pseudo echo caused by said detected ambient noise.

2. The echo canceller according to claim 1, wherein said adaptive filter has a plurality of tap coefficients used to set a different time delay and attenuation coefficient depending on the receiving signal and the sending signal input thereto, in order to generate a pseudo echo corresponding to the receiving signal and the sending signal input thereto, said adaptive filter stops operations for changing said tap coefficients when said noise detecting signal is received.

3. The echo canceller according to claim 2 wherein said adaptive filter is a transversal filter.

4. The echo canceller according to claim 1, wherein said noise detecting section is provided with memory that stores a signal level and a frequency of the target ambient noise.

5. The echo canceller according to claim 1 wherein said noise detecting section detects a noise signal picked up by said transmitter.

6. The echo canceller according to claim 1, wherein said noise detecting section receives a noise signal picked up by a microphone designed specifically for detection of an ambient noise, the microphone being separate from said transmitter.

7. A method of echo cancellation for preventing an echo of an output from a receiver receiving a signal transmitted by a transmitter from returning to the receiver through the transmitter, comprising:
    detecting an ambient noise surrounding the transmitter;
    comparing the detected ambient noise to a prestored representation of target ambient noise;
    generating a noise detecting signal if a level of the detected ambient noise exceeds a level of the target ambient noise;
    generating a pseudo echo corresponding to a change in a receiving signal received by the receiver and a sending signal output from the transmitter, in order to prevent the echo from returning; and
    setting output characteristics of the pseudo echo as fixed, to inhibit a change of the pseudo echo caused by the detected ambient noise, responsive to the generated noise detecting signal.

8. The method of echo cancellation according to claim 7, wherein said generating a pseudo echo comprises adjusting a plurality of tap coefficients of an adaptive filter to set a time delay and an attenuation coefficient of the adaptive filter responsive to the receiving signal and the sending signal, said adjusting of the plurality of tap coefficients is stopped when the noise detecting signal is generated.

9. The method of echo cancellation according to claim 8, wherein the adaptive filter is a transversal filter.

10. The method of echo cancellation according to claim 7, wherein the prestored representation of the target ambient noise comprises a signal level and a frequency of the target ambient noise.

11. The method of echo cancellation according to claim 7, wherein said detecting an ambient noise comprises detecting a noise signal picked up by the transmitter.

12. The method of echo cancellation according to claim 7, wherein said detecting an ambient noise comprises receiving a noise signal picked up by a microphone designed specifically for detection of ambient noise, the microphone being separate from the transmitter.

13. An echo canceller comprising:
    a detector that detects an ambient noise surrounding a microphone in a two-way communication system, compares the detected ambient noise to a prestored representation of target ambient noise, and generates a noise detection signal if a level of the detected ambient noise exceeds a level of the target ambient noise; and
    an adaptive filter that generates a pseudo echo signal for echo cancellation responsive to a speaker driving signal and a microphone signal from the microphone, wherein said adaptive filter sets output characteristics of the pseudo echo signal as fixed responsive to generation of the noise detection signal.

14. The echo canceller of claim 13, wherein said adaptive filter is a transversal filter.

15. The echo canceller of claim 13, wherein said detector comprises a memory that stores a signal level and a frequency of the target ambient noise.

16. The echo canceller of claim 13, wherein said detector determines the detected ambient noise from the microphone signal.

17. The echo canceller of claim 13, wherein said detector comprises a second microphone that picks up and determines the detected ambient noise independently of the microphone signal.

* * * * *